US005596440A

United States Patent [19]

Patz et al.

[11] Patent Number: 5,596,440
[45] Date of Patent: Jan. 21, 1997

[54] METHOD AND APPARATUS FOR ANALYZING THE CHARACTERISTICS OF AN OPTICAL CIRCUIT

[75] Inventors: Dietmar Patz, VS-Wielersbach; Emmerich Mueller, Aidlingen; Christian Hentschel, Gaufelden, all of Germany

[73] Assignee: Hewlett-Packard Company, Palo Alto, Calif.

[21] Appl. No.: 511,741

[22] Filed: Aug. 7, 1995

[30] Foreign Application Priority Data

Aug. 16, 1994 [EP] European Pat. Off. ............ 94112758
Sep. 8, 1994 [EP] European Pat. Off. ............ 94114090

[51] Int. Cl.$^6$ ................................................ H04B 10/08
[52] U.S. Cl. ........................ 359/177; 359/110; 356/73.1
[58] Field of Search ................................ 359/110, 173, 359/174, 177, 178, 333, 337; 356/76.1, 323, 325

[56] References Cited

U.S. PATENT DOCUMENTS

| | | | |
|---|---|---|---|
| 3,973,849 | 8/1976 | Jackson et al. | 356/97 |
| 4,171,913 | 10/1979 | Widly et al. | 356/325 |
| 4,223,995 | 9/1980 | Fletcher | 356/418 |
| 4,464,051 | 8/1984 | Talmadge et al. | 356/323 |
| 4,644,485 | 2/1987 | Ferber et al. | 364/569 |
| 4,825,076 | 4/1989 | Shields | 250/343 |
| 4,995,724 | 2/1991 | Sonobe et al. | 356/323 |
| 5,223,705 | 6/1993 | Aspell et al. | 359/177 |
| 5,340,979 | 8/1994 | Baney et al. | 250/214 B |

OTHER PUBLICATIONS

IEEE Photonics Technology Letters, vol. 6, No. 2, 1 Feb. 1994, pp. 199–201—Bertilsson et al. 'Noise Figure of Erbium Doped Fiber Amplifiers, etc.'

Electronics Letters, vol. 27, No. 9, 25 Apr. 1991; pp. 744–745, Walker et al. 'Gain and Noise Characterisation, etc.'

IEEE Photonics Technology Letters, 6, No. 2, 1 Feb. 1994, pp. 202–204 Sato et al. 'Noise Figure Monitoring, etc.'

IEEE Photonics Technology Letters, vol. 2, No. 12, 1 Dec. 1990, pp. 863–865—Pedersen et al. 'Detailed Theoretical and Experimental Investigation, etc.'

European Search Report—24 Jul. 1995.

Primary Examiner—Wellington Chin
Assistant Examiner—Rafael Bacares

[57] ABSTRACT

This invention relates to a method and an apparatus for the measurement of amplified spontaneous emission (ASE) noise of an erbium-doped fiber amplifier in the presence of an optical signal. The known technique to perform ASE measurement at the actual signal wave length is called pulse-recovery technique. The disclosed technique requires two highly blocking optical switches for the incident and the outgoing laser beams of the amplifier having a short switching time and switching both beams synchronously with high accuracy. An inventive method comprises a first step in which a first optical signal is supplied to said optical circuit via means for blocking and in which second optical signal, generated by said optical circuit, is supplied to at least one means for analyzing said second signal via said means for blocking and a second step in which said first optical signal is blocked by said means for blocking and in which said second optical signal is still supplied to said means for analyzing said second signal via said means for blocking.

16 Claims, 3 Drawing Sheets

METHOD AND APPARATUS FOR ANALYZING THE CHARACTERISTICS OF AN OPTICAL CIRCUIT

FIELD OF THE INVENTION

This invention relates to optical circuits and, more particularly, to a method and an apparatus for determining the characteristics of an optical circuit having gain, such as an optical amplifier, by determining the noise of the means for analyzing, the amplified spontaneous emission and the gain, in the presence of an optical signal using a gated source technique.

BACKGROUND OF THE INVENTION

Optical amplifiers are commonly used in optical communication systems. One of the parameters that is important in characterizing an optical amplifier is amplified spontaneous emission (ASE) noise in the presence of an optical signal. The amplified spontaneous emission noise represents a noise signal that is generated within the optical amplifier and is amplified by the amplifier. The ASE noise typically has a wider bandwidth than the optical signal. The measurement of ASE noise is important in determining the noise figure of an optical amplifier as well as ASE buildup in communication systems, where ASE noise can limit performance.

The output of an optical amplifier includes a narrow band optical signal and broader band noise generated within the amplifier. When no signal is present, the amplifier generates and amplifies noise. However, when an optical signal is present, the output noise level is reduced in comparison with the noise level in the absence of an optical signal due to amplifier gain reduction. The gain reduction depends on the amplitude of the optical signal. Thus, in order to accurately characterize amplifier performance, the ASE noise must be measured at an optical signal level and wavelength that corresponds to normal operation.

A known technique to perform ASE measurement at the actual signal wavelength is called pulse-recovery technique. The tunable laser source is gated on and off with a fast (<1 µs) fall time. The gated-on-time needs to be long enough such that the erbium-doped fiber amplifier (EDFA) stabilizes to its steady state for the input signal. Once the EDFA is in its steady state, the switch rapidly extinguishes the signal incident on the EDFA. Immediately after the signal is gated off, the ASE level at the amplifier output will be comparable to the true EDFA ASE level without the deleterious effects of the stimulated emission (SE) generated by the laser source. The ASE transient is recorded either with an optical spectrum analyzer (OSA) or in conjunction with an oscilloscope connected to the analog output of the OSA. For the portion of the ASE transient missed after the signal was gated off, extrapolation can be used to determine the desired ASE power density.

As the source signal is switched on, the EDFA output momentarily peaks and then returns to its steady state power level. As the source signal is switched off, the EDFA output signal drops and then the EDFA ASE power rises to its value when no signal is present. The actual ASE power density is found by extrapolating the ASE transient response immediately after the time when the source was switched off.

The disclosed technique requires two highly blocking optical switches for the incident and the outgoing laser beams of the amplifier having a short switching time and switching both beams synchronously with high accuracy.

As such a switching unit with the required accuracy is not available there is a need for a method and an apparatus by which the required accuracy can be obtained.

SUMMARY OF THE INVENTION

The present invention relates to a method and an apparatus for analyzing the characteristics of an optical circuit.

Basically, a method according to the invention comprises:

a first step in which a first optical signal is supplied to said optical circuit via means for blocking and in which a second optical signal, generated by said optical circuit, is supplied to at least one means for analyzing said second signal via said means for blocking;

a second step in which said first optical signal is blocked by said means for blocking and in which said second optical signal is still supplied to said means for analyzing said second signal via said means for blocking.

It is expressly noted that optical does not mean only visible light but also for example infrared and ultraviolet light. It will be understood that the means for blocking, especially the chopper-blade, will be chosen to assure it provides at least one area which is transparent and one other area which blocks the specific form of light which is used.

According to a preferred embodiment, said optical circuit is an optical amplifier. During the first step the amplifier is able to stabilize to its steady-state and the amplification-factor can be determined afterwards by comparison of the measured input power and the measured output power. At the beginning of the second step the first optical signal generated by an optical source, for example a laser source, is switched off by the chopper and the amplified spontaneous emission noise (ASE) is determined by an optical/electrical converter (OE) and an analyzer. As an analyzer an oscilloscope or a data processing unit in conjunction with analog/digital converter (A/D) is preferably used. It will be understood that the described measurements can be made by any other suitable means for analyzing.

According to a further embodiment of the invention the optical amplifier is an erbium-doped fiber amplifier (EDFA) or a praseodymium-doped fiber amplifier (PDFA). The optical fiber amplifiers are commonly used in transmission links or networks to compensate signal losses caused by optical scattering and absorption. These losses can be balanced by optical gain. By operating the amplifier into its saturation region, where the gain is compressed, optical power self-regulation can be achieved since larger signals will experience less gain than smaller signals. Additionally, power amplification allows one transmitter to drive many optical fibers in parallel.

Another embodiment of the invention comprises a third step in which the second optical signal is blocked by a chopper-blade according to the invention. During the third step the noise of the means for analyzing is measured and taken into consideration for the determination of amplification-factor and/or ASE-noise.

According to one embodiment of the invention the first through third step is performed 100 times in a second. It will be understood that one skilled in the art is able to modify this rate depending on the actual requirements.

The apparatus according to the invention for blocking at least a first and a second optical signal, comprises a first optical path with first optical input means and first optical output means for said first optical signal;

a second optical path with second optical input means and second optical output means for said second optical signal;

a rotating means being arranged in said first optical path and in said second optical path.

The proposed apparatus allows to configurate two highly blocking optical switches for the incident and the outgoing laser beams of the amplifier requiring only one rotating means. The rotating means having a short switching time and both beams are switched synchronously with high accuracy.

According to one embodiment of the invention the rotating means comprises a chopper-blade with a radius R1 along an angle which is between 0° and 360° and a second radius R2 within the remaining angle. As known every point on a circle can be described by radius R and an angle. Preferably, the angle is 240° and the first and the second optical path are displaced from each other whereby both paths are arranged radially to the radius R3 and R1<R3<R2. The underlying principle of this embodiment is that the rotating means is configurated that during its revolution: a) the first optical path is blocked, while the second optical path is open during a first period, b) the first and the second optical path are open during a second time interval and c) the second optical path is blocked during a third time interval by the rotating means.

According to a preferred embodiment of the invention the first and the second optical paths are displaced from each other by an angle of about 120°. Thereby it is obtained that the foregoing three time intervals are of the same length if the angle φ is 240°. It will be understood that other angles and radiuses can be provided by one skilled in the art if time intervals with different lengths are required.

According to one other embodiment the chopper-blade being tilted relative to its axis of rotation, whereby its axis is tilted about 4°. By tilting the axis of rotation of the rotating means respectively the chopper-blade, the light from the first optical input means is reflected by the chopper-blade out of the area of the first optical input means. Furthermore, light from said second optical input means is reflected out of the area of the input means. Thereby, the influence of the chopper-blade on both input means is minimized.

According to a preferred embodiment of the invention the chopper-blade is driven via a driving shaft by a motor and being adjustable at least vertically to said driving shaft. Thus manufacturing tolerances of the chopper and its parts can be compensated.

According to a preferred embodiment of the invention the chopper-blade is a disc of glass and the structures defined by the radiuses R1, R2 and the angle φ are constituted by a coating on the chopper-blade. By these measures a chopper-blade with a transparent and an opaque area can be easily manufactured whereby an unbalance is neglected. Preferably, the opaque coating is a metal like gold or any other non-transparent thin layer.

Furthermore, the chopper-blade can be constituted by aluminum or straightened brass in a non-disc-shaped form if measures are taken to avoid unbalance.

Additionally, in the first and the second optical path optical lenses can be provided to assure to have a beam being focussed where the chopper-blade blocks the beam to achieve a fast switching time.

It is understood and expressly noted that the present invention relates to all useful and novel combinations of the above disclosed features, whether alone or in any other or arbitrary combination. Furthermore, all cited advantages can also be seen as objects solved by the invention in its entirety.

BRIEF DESCRIPTION OF THE DRAWINGS

For a better understanding of the present invention, together with other and further objects, advantages and capabilities thereof, reference is made to the accompanying drawings, which are incorporated herein by reference and in which:

FIG. 1 depicts the inventive system for determining ASE noise in the presence of an optical signal comprises a tunable laser source (TLS) 1, a chopper 6, an erbium-doped fiber amplifier (EDFA) 7, a lambda-filter 8, an optical/electronic converter 11 and an oscilloscope 12.

Figure 1:
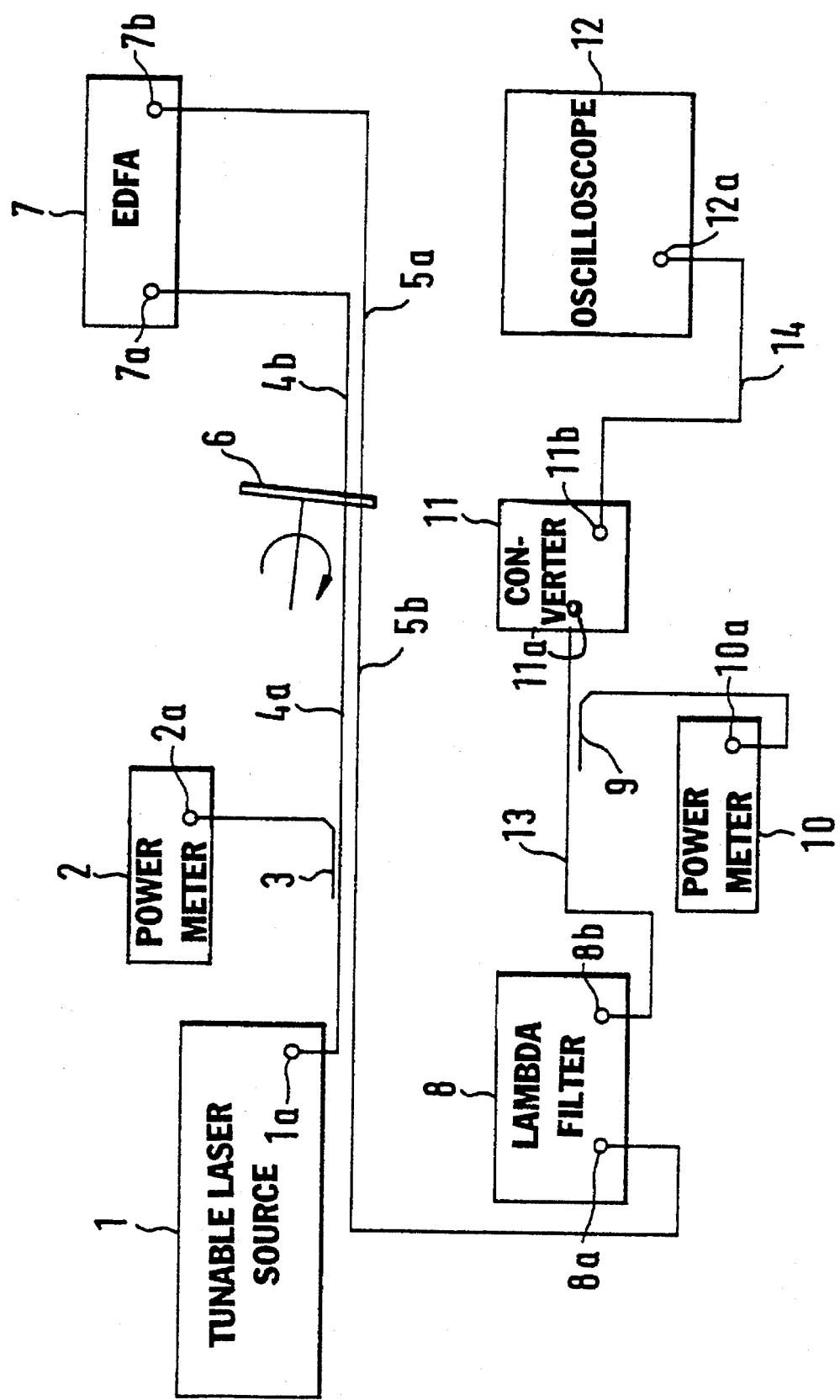
FIG. 1 is a block diagram of a system for determining ASE noise in the presence of an optical signal in accordance with the present invention.

An input fiber 4a connects the output 1a of the tunable laser source 1 with the first input of chopper 6. A fiber 4b connects the first output of the chopper 6 with the input 7a of the amplifier 7. The output 7b of the amplifier 7 is connected with the second input of the chopper 6 by a fiber 5a. The second output of the chopper 6 is connected with the input 8a of the lambda-filter 8 via a fiber 5b. The output 8b of the lambda-filter 8 is connected with the input 11a of the optical/electronic converter 11 via a fiber 13. The output 11b of the optical/electronic converter 11 is connected with the input 12a of the oscilloscope 12 via an electrical cable 14.

Optionally, the input 2a of a first power meter 2 is connectable via a coupler 3 with the fiber 4a and the input 10a of a second powermeter 10 is connectable via a coupler 9 with the fiber 13.

Figure 2A:
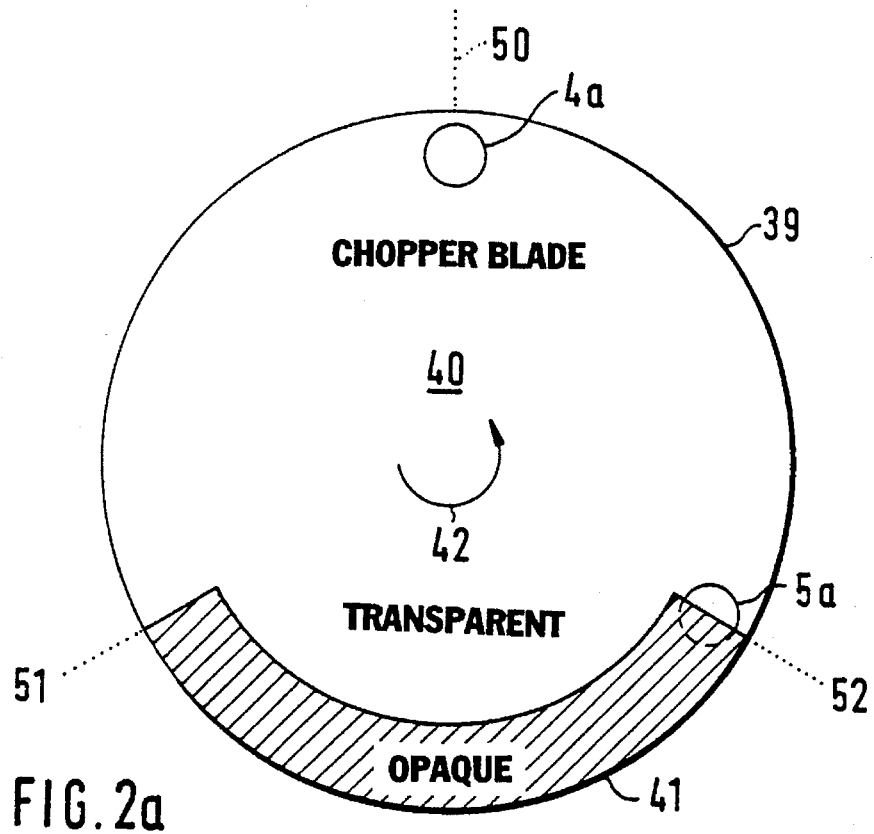
FIG. 2a exhibits the configuration of the chopper-blade in FIG. 1 constituted of glass with an opaque and a transparent area.
Figure 2B:
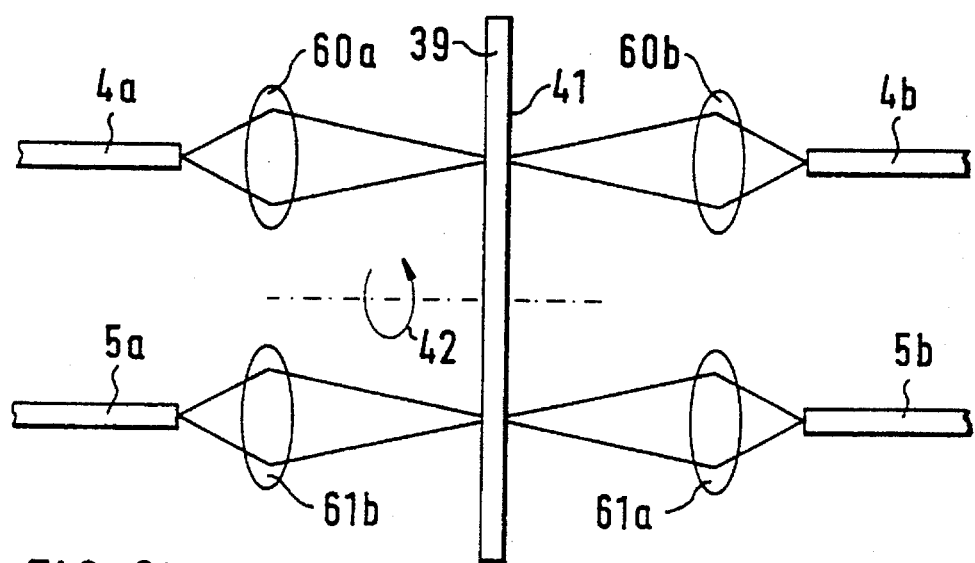
FIG. 2b is a block diagram of the chopper in FIG. 1 in greater detail.

FIGS. 2a and 2b show the configuration of the chopper-blade 39 of chopper 6 in FIG. 1. Chopper blade 39 has the configuration of a disc comprising a transparent area 40 and a metal coated circular ring 41. Dotted line 51 indicates where the angle of rotation t of the chopper-blade is 0°, while dotted line 51 indicates an angle of rotation t=120°. At dotted line 52 the angle of rotation t is 240°. At t=0° the fiber 4a is connected to the first input of the chopper 6. Opposite to the first input of the chopper 6 the fiber 4b (see FIG. 2b) is connected to the first output of the chopper 6. At t=240°, indicated by dotted line 52, fiber 5a is connected to the second input of chopper 6 and fiber 5b (see FIG. 2b) is connected with the second output of the chopper 6 opposite to the second input of the chopper. Either between first input and first output or between second input and second output of the chopper 6 an air gap is provided in which the chopper-blade 39 rotates in the direction of arrow 42. During the rotation of the chopper-blade 39 the opaque area 41 of the chopper-blade blocks successive the passage of light from the inputs of the chopper 6 to its outputs. To achieve a fast switching time optical lenses 60a, b and 61a, b are provided in the optical path between the fibers 4a, b and the fibers 5a, b. The lenses focus each beam passing the chopper-blade 39 at the place where the chopper-blade blocks each beam.

In FIG. 2a the fibers as well as the metal-coated circular ring 41 are arranged at the periphery of the disc-shaped chopper-blade 39 (see FIG. 2 *b*). It will be understood that the fibers could be arranged more centrically if circular ring 41 is also arranged in a manner that it is able to block light passing from the inputs to the outputs of chopper 6. Furthermore, it will be understood that it is within the scope of the invention to use any rotating element which allows to block light passing from the inputs to the outputs of chopper 6 during a predetermined time interval. Preferably, the opaque area is coated by a gold layer but it will be understood that it is within the scope of the invention to use any other rotating element with a transparent and an opaque area and that the element can be non-disc-shaped. In this case preventive measures against unbalance can be taken. Furthermore, the coating of a transparent disc of glass according to the invention allows to configurate a well defined changing from a transparent to an opaque area.

Figure 3A:
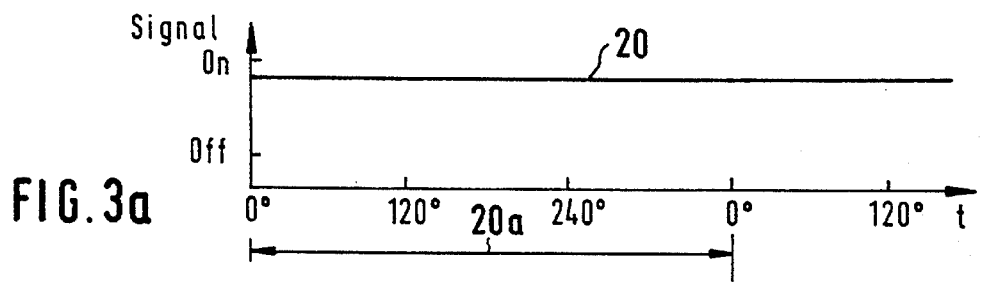
FIG. 3a is a graph of the output signal of the source in FIG. 1 as a function of the angle of rotation t of the chopper-blade.

FIG. 3a exhibits the output signal of the laser source in FIG. 1 as a function of the angle of rotation t of the chopper-blade 39. The signal 20 of the source is in the in-state during the whole revolution from 0° to 360°, shown by the arrows 20a, of the chopper-blade 39.

Figure 3B:
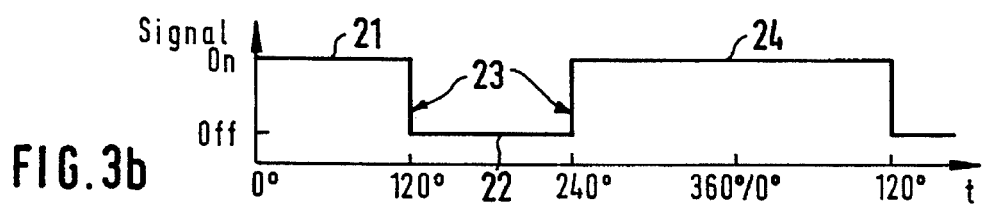
FIG. 3b is a graph of the input signal of the erbium-doped fiber amplifier (EDFA) in FIG. 1 as a function of the angle of rotation t of the chopper-blade.

FIG. 3b shows the input signal of the erbium-doped fiber amplifier (EDFA) in FIG. 1 as a function of the angle of rotation t of the chopper-blade 39. From t=0° to t=120° the opaque area 41 of the chopper-blade 39 moves from t=240°, shown by dotted line 52, to t=360°, shown by dotted line 50. Until the opaque area 41 reaches fiber 4a the input signal of the amplifier is in the on-state, shown by line 21 in FIG. 3b. From t=120° to t=240° the light leaving fiber 4a is blocked and cannot reach the first output of chopper 6 so that the input signal of the amplifier is switched rapidly to the off-state, as shown by line 22 in FIG. 3b. The fall time is 1 µs, shown by the arrows 23. To reach a fall time of 1 µs the chopper-blade 39, shown in FIG. 2, rotates with 6000 r.p.m. and the optical fibers are arranged 120° apart from each other and 2.3 cm from the center of the chopper-blade 39. It will be understood that it is within the scope of the invention to vary one or more of said parameters to obtain a shorter or longer fall time. At t=240° the opaque area 41 has passed fiber 4a and the input signal of the amplifier is switched to the on-state as indicated by line 24.

Figure 3C:
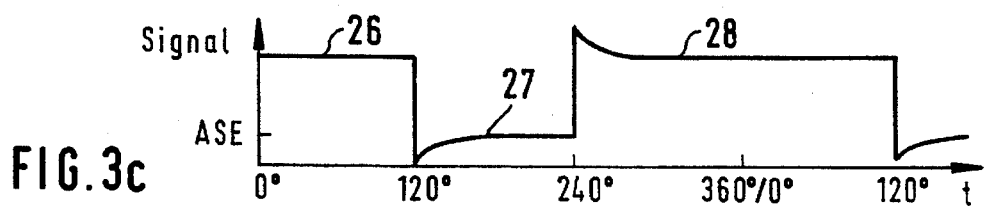
FIG. 3c is a graph of the output signal of the EDFA in FIG. 1 as a function of the angle of rotation t of the chopper-blade.

FIG. 3c shows the output signal of the amplifier as a function of the angle of rotation t of the chopper-blade. From t=0° to t=120° the light generated by the source 1 passes to the input of the amplifier via first input and first output of the chopper 6. This results in a strong output signal of the amplifier 7 as indicated by line 26 from t=0° to t=120°. At t=120° the opaque area 41 reaches the air gap between first input and first output of the chopper 6 and switches the input signal of the amplifier to its off-state. This results to an output signal ascending from a noise signal level to the ASE-signal-level, as shown by line 27 in FIG. 3c. At t=240° the opaque area 41 has passed the air gap between first input and first output of the chopper, so that the input of the fiber amplifier 7 is in its on-state. The amplifier amplifies the input signal to a signal as shown by line 28 in FIG. 3c.

Figure 3D:
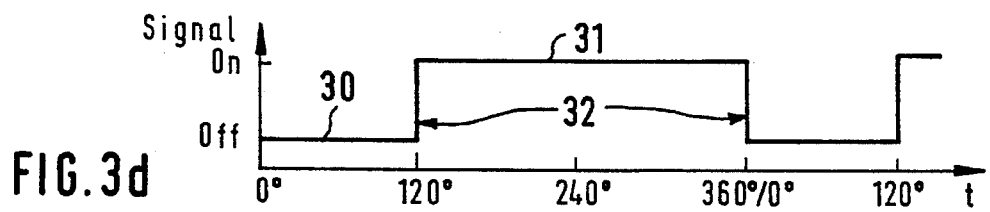
FIG. 3d is a graph showing the opening or blocking of the light generated by the EDFA through the chopper-blade in FIG. 1 as a function of the angle of rotation t of the chopper-blade.

FIG. 3d shows the opening or blocking of the light generated by the EDFA 7 through chopper-blade 39 as a function of the angle of rotation t of the chopper-blade. From t=0° to t=120° the opaque area 41 of the chopper-blade 39 passes the air gap between second input and second output, so that no light passes as indicated by line 30. From t=120° to t=360° the light passes from second input to second output of the chopper 6 as shown by line 31, The time interval while light can pass from second input to second output is 6.6 ms as indicated by the arrows 32.

It will be understood that this time interval can be easily modified if the chopper-blade 39 rotates with more or less than 6000 r.p.m. or if the first and second in- and outputs are arranged with a larger or shorter distance to the center of the chopper-blade 39.

Figure 3E:
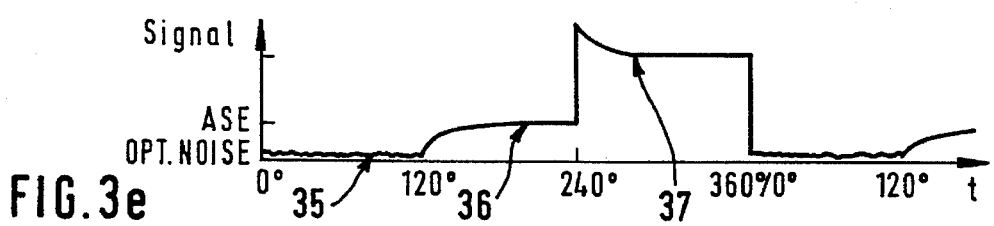
FIG. 3e is a graph of the signal displayed by the oscilloscope in FIG. 1 as a function of the angle of rotation t of the chopper-blade.

FIG. 3e is a graph of the signal shown by the oscilloscope as a function of the angle of rotation t of the chopper-blade. From t=0° to t=120° the opaque area 41 of the chopper-blade 39 avoids that light can pass from the second input to the second output of the chopper 6. Therefore, only the deleterious noise is displayed by the oscilloscope 12 as shown by line 35 in FIG. 3e. From t=120° to t=240° the ASE-signal of the amplifier 7 can pass via second input and second output of the chopper 6. During the related time interval the opaque area 41 blocks the passage of light from the first input to the first output of chopper 6 and the amplifier generates amplified spontaneous emission (ASE) as indicated by line 36 which is measured. This measurement is performed to be able to calculate the optical noise figure of the amplifier. From t=240° to t=360° light can pass either via first input and first output or via second input and second output of the chopper 6. The input signal of the amplifier 7 is in its on-state and the amplifier generates coherent light as shown by line 37. This measurement is performed to be able to calculate the optical gain of the amplifier.

What is claimed is:

1. A method for analyzing the characteristics of an optical circuit, comprising:

a first step in which a first optical signal is supplied to said optical circuit via means for blocking and in which a second optical signal, generated by said optical circuit, is supplied to at least one means for analyzing said second signal via said means for blocking;

a second step in which said first optical signal is blocked by said means for blocking and in which said second optical signal is still supplied to said means for analyzing said second signal via said means for blocking; and a third step in which said second optical signal is blocked by said means for blocking and during the third step, the noise of said first or second means for analyzing is determined.

2. A method as defined in claim 1, wherein said optical circuit is an optical amplifier, whose amplification-factor is determined in said first step by first means for analyzing and whose amplified spontaneous emission noise (ASE) is determined in said second step by said first or by second means for analyzing.

3. A method as defined in claim 1, wherein said optical amplifier is an erbium-doped fiber amplifier (EDFA) or a praseodymium-doped fiber amplifier (PDFA).

4. A method as defined in claim 2, wherein in said first step said optical amplifier stabilizes to its steady-state before its amplification-factor or amplified spontaneous emission noise is determined.

5. A method as defined in claim 1, wherein the first, second and/or third step is performed sequentially, with about 100 times in a second (100 Hz).

6. Apparatus for determining amplified spontaneous emission (ASE) noise of an optical amplifier in the presence of an optical signal, comprising:
- a first optical path with first optical input means and first optical output means for said first optical signal;
- a second optical path with second optical input means and second optical output means for said second optical signal;
- a rotating means arranged in said first optical path and in said second optical path; and
- one or more pairs of optical lenses arranged in one or more of said optical paths, the lenses of each pair focused on said rotating means from opposite sides and said rotating means tilted relative to an axis of rotation thereof.

7. Apparatus as defined in claim 6, wherein said rotating means comprises:
- a chopper-blade with a radius R1 along an angle $0<\phi<360°$ and a radius R2 along an angle of $360°-\phi$ and R2>R1.

8. Apparatus as defined in claim 7, wherein said angle $\phi$ is 240°.

9. Apparatus as defined in claim 6, wherein
said first and said second optical path are displaced from each other; and
said first and said second optical path are arranged radially with a radius R3 and R1<R3<R2.

10. Apparatus as defined in claim 9, wherein said first and said second optical path are displaced from each other by an angle of about 120°.

11. Apparatus as defined in claim 5, wherein said chopper-blade is tilted about 4°.

12. Apparatus as defined in claim 7, wherein said chopper-blade is driven via a driving shaft by a motor.

13. Apparatus as defined in claim 7, wherein said chopper-blade is adjustable at least vertically to said driving shaft.

14. Apparatus as defined in claim 7, wherein said chopper-blade is a disc of glass and the structures defined by said radiuses R1, R2 and said angle $\phi$ are constituted by a coating on said chopper-blade.

15. Apparatus as defined in claim 14, wherein said coating is a metal.

16. Apparatus as defined in claim 7, wherein the chopper-blade is constituted by aluminum or straightened brass.

* * * * *

UNITED STATES PATENT AND TRADEMARK OFFICE
CERTIFICATE OF CORRECTION

PATENT NO. : 5,596,440
DATED : January 21, 1997
INVENTOR(S) : Dietmar Patz, et al.

It is certified that error appears in the above-identified patent and that said Letters Patent is hereby corrected as shown below:

At Col. 8, line 6, "claim 5" should be deleted and --claim 7-- inserted therefor.

Signed and Sealed this

First Day of July, 1997

Attest:

BRUCE LEHMAN

Attesting Officer       Commissioner of Patents and Trademarks